United States Patent

Botsch et al.

[11] Patent Number: 6,073,735
[45] Date of Patent: Jun. 13, 2000

[54] BRAKE DISC

[75] Inventors: Siegfried Botsch, Rauschenbert; Hubert Koch, Rheinfelden, both of Germany

[73] Assignee: Aluminium Rheinfelden GmbH, Rheinfelden, Germany

[21] Appl. No.: 09/150,939

[22] Filed: Sep. 10, 1998

[30] Foreign Application Priority Data

Feb. 2, 1998 [EP] European Pat. Off. .............. 98810073

[51] Int. Cl.[7] .................................................. F16D 65/12
[52] U.S. Cl. .............................. 188/218 XL; 188/251 M; 188/264 AA
[58] Field of Search ................ 188/218 XL, 73.2, 188/264 A, 264 AA, 71.1, 250 E, 264 R, 18 A, 18 R, 218 R, 251 R, 251 A, 251 M; 164/98

[56] References Cited

U.S. PATENT DOCUMENTS

| | | | |
|---|---|---|---|
| 2,412,432 | 12/1946 | Tack | 188/218 XL |
| 2,423,056 | 6/1947 | Tarbox | 188/218 XL |
| 2,603,316 | 7/1952 | Pierce | 188/264 A |
| 2,769,512 | 11/1956 | Tack | 188/218 XL |
| 3,187,851 | 6/1965 | Dean | 188/218 XL |
| 4,792,022 | 12/1988 | Thiel | 188/264 AA |
| 4,819,769 | 4/1989 | Metzler et al. | |
| 5,109,960 | 5/1992 | Gunther | |
| 5,161,652 | 11/1992 | Suzuki | 188/218 XL |
| 5,429,214 | 7/1995 | Wübelhaus et al. | 188/264 A |
| 5,823,303 | 10/1998 | Schwarz et al. | 188/218 XL |

FOREIGN PATENT DOCUMENTS

| | | |
|---|---|---|
| 4436653 | 4/1995 | Germany . |
| 2107012A | 9/1982 | United Kingdom . |

*Primary Examiner*—Douglas C. Butler
*Attorney, Agent, or Firm*—Bachman & LaPointe, P.C.

[57] ABSTRACT

A brake disc (10) has a cover (12) made of a cast aluminium alloy and a brake ring (14) made of cast steel or cast iron. The cover (12) is cast onto pockets (22) which have a radially inwardly facing pocket opening next to the pocket edge (26), formed on the internal circumference ($U_i$) of the brake ring, creating a radial distance (b) between the cover (12) and the brake ring (14). The pocket edge (26) is surrounded by the cast cover (12) and the pockets (22) are substantially filled with the cast aluminium alloy. Because of this method of connecting the brake ring (14) to the cover (12), umbrella-like distortion can be largely avoided.

13 Claims, 2 Drawing Sheets

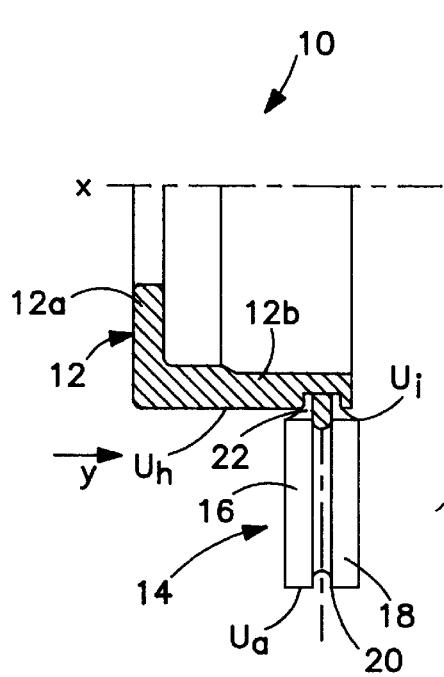
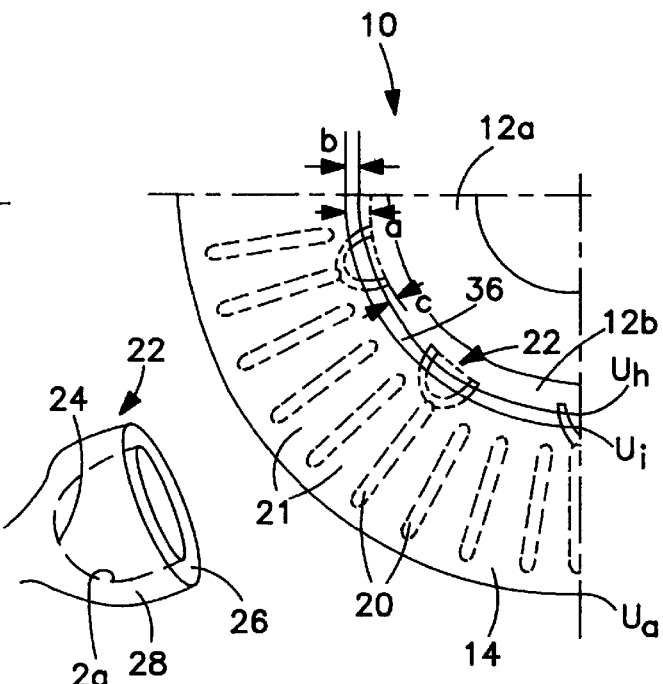
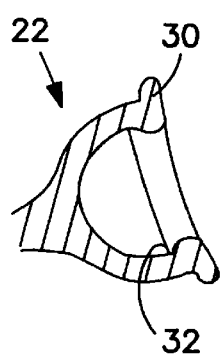
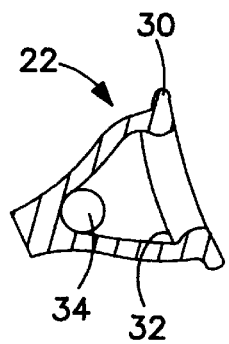
FIG. 1  FIG. 3  Fig. 2  FIG. 4  FIG. 5

BRAKE DISC

BACKGROUND OF THE INVENTION

The invention relates to a brake disc with a cover made of a cast aluminium alloy and a brake ring made of cast steel or cast iron, where the cover is cast onto anchoring pieces protruding radially inwards from the inner circumference of the brake ring, leaving a radial spacing between the cover and the brake ring.

Cast iron brake discs in ventilated or solid form are generally known. The hub connection is made via the cover, which is normally cast in one piece with the brake disc or is a pressed-on plate construction. Depending upon the design the weight of the brake disc is between around 6 and 15 kg for cars and up to approximately 40 to 50 kg for goods vehicles.

A concept is known from ATZ Automobiltechnische Zeitschrift 96 (1994), in which the brake ring is made of cast grey iron and the cover is made of an aluminium alloy. The connection here is made by stainless steel bolts. The weight saving of this type of design compared to normal single-material brake discs is about 10%. However, this concept is very expensive and is therefore only used in small production runs of high value vehicles.

A brake disc of the type described at the start was published in GB-A-2107012. In this the disc was made of an aluminium alloy, which was cast onto the brake ring. A significant disadvantage of this solution is the very rigid connection of the cover to the brake ring, which consequently creates a tendency towards umbrella-like distortion, leading to a rubbing of the brakes.

The brake disc represents an unsprung mass in the vehicle, which means that a weight saving in this area would lead to a noticeably improved level of ride comfort and entail a further weight reduction. By the use of temperature-conductive materials such as aluminium alloys, the life of the brake discs can also be significantly extended.

The invention is therefore based upon the task of creating a brake disc of the type described initially, which has a reduced umbrella-like or other distortion and improved heat dissipation.

SUMMARY OF THE INVENTION

A solution of the problem in accordance with the invention leads to the anchoring pieces being constructed as pockets formed on the brake ring with a pocket edge bordering the radially inwardly facing pocket opening, where the pocket edge is surrounded by the cover casting and the pockets are substantially filled with the cast aluminium alloy.

The pocket-shaped anchoring pieces according to the invention give rise, after being surrounded tightly by the cover casting, to a quasi-floating mounting of the brake ring. Because of this special connection the brake ring in this dual material brake disc can expand freely in the radial direction when heated due to braking. The pockets serve here as guides and also absorb forces in the axial direction. Because of this "free" expansion of the brake ring, the brake ring does not act as an umbrella. Only small stresses occur in the vicinity of the connection between cover and brake ring, which however lie in the elastic area of the material.

Heat is transferred from the brake ring to the cover only via the internal surfaces of the pockets filled with cast aluminium alloy. This heat transfer is measured such that the cast aluminium alloy used retains its mechanical properties.

It has been shown that in HFT tests, i.e. in brake tests with particularly high thermal loads on the brake disc, the temperature in the cover did not rise above 270° C. This temperature lies in the temperature range of a normal single material disc.

The construction according to the invention leads to a weight reduction of around 10% compared to a single material brake disc. The reduction of unsprung mass also gives rise to an increase in ride comfort and leads to further weight reductions in the vehicle suspension.

Preferably the number of pockets connected to the brake ring is between 3 and 14.

To improve the connection of the brake ring to the cover an externally protruding annular ridge may be formed onto the pocket wall. Furthermore, the pocket may have an annular undercut in the vicinity of the pocket edge.

Because the pockets are closed during the casting on of the cover, an air cushion may form. In order to ensure a complete filling of the pocket with the cast aluminium alloy during the casting on of the cover to the brake ring and therefore an optimal heat transfer from the brake ring to the cover, a ventilation opening may be provided near the pocket floor.

To obtain a further improved cooling the cover wall between adjacent pockets may have recesses for the direct access of air to the brake ring. This recess may start from the edge of the cover wall or it may be designed as a slot. With this measure a better cooling of the brake ring is obtained besides the fact that also the cover is less strongly heated.

An internally ventilated brake disk has a brake ring which comprises an external and an internal friction ring with radially positioned connecting webs. Preferably that the pockets are connected with the connecting webs. The recesses lead here to a direct air passage between the friction rings.

The recesses may be made by milling out after manufacture. Preferably the formation of the recesses is made by forming during the manufacturing process, e.g. during casting.

In the preferred design of the brake disc according to the invention, the cover is made of a heat-resistant, if necessary fibre and/or particle-reinforced cast aluminium alloy which may also be spray compacted, and the brake ring is made of cast steel or cast iron, in particular from a cast iron alloy with a high carbon content.

Preferably the cover is cast onto the brake ring, where the connection between the cover and brake ring is made by sand casting, low pressure casting, chill casting, pressure casting, die casting, squeeze casting or thixo casting.

BRIEF DESCRIPTION OF THE DRAWINGS

Further advantages, characteristics and details of the invention can be taken from the following description of preferred design examples and based upon the drawings; these show the following diagrammatically FIG. 1 a partial cross-section through a brake disc;

FIG. 2 a top view of the brake disc of FIG. 1 viewed in the direction y;

FIG. 3 a diagonal view of a pocket on the brake ring of FIG. 1;

FIG. 4 a cross-section through a second design variant of a pocket;

FIG. 5 a cross-section through a third design variant of a pocket with ventilation opening;

DETAILED DESCRIPTION

Figure 6:
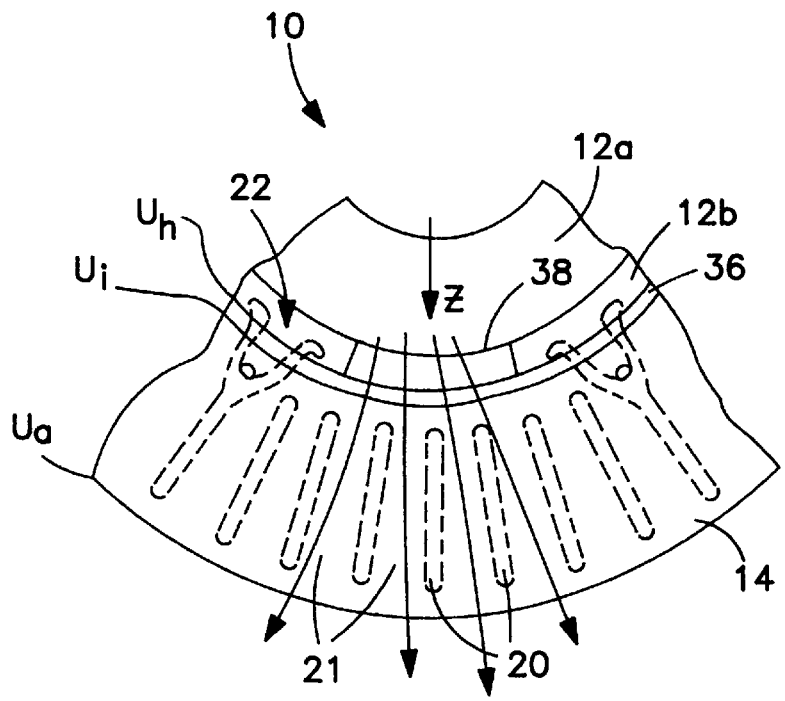
FIG. 6 a top view of a part of a brake disk with air passage openings.

A brake disc 10 illustrated in FIG. 1 and 2 has a hub section or cover 12 and an internally ventilated brake ring 14 connected to this. For the assembly of the brake disc 10 a vehicle wheel hub, not shown in the drawing, is put onto the cover 12, which consists of a bottom part 12a and a cylindrical part 12b, in the direction of the disc x-axis and bolted firmly to this.

The brake ring 14 illustrated in the drawing is internally ventilated and comprises an external friction ring 16 and an internal friction ring 18, which are connected via radially positioned webs 20 extending from the vicinity of the external circumference $U_a$ to the vicinity of the internal circumference $U_i$. Between the webs 20 radially extending air gaps 21 are formed. Every fourth web 20 ends in a pocket 22, the pocket edge 26 of which protrudes above the internal circumference $U_i$ by a distance a. In the present example, ten pockets 22 are arranged around the internal circumference $U_a$ of the brake ring 14. The pocket edge 26 is slightly oval in the radial top view, whereby the longer axis of the oval lies in the plane of the disc.

During the casting of the brake ring 14 to the cover 12 a connection is made via a pocket wall 28 extending from pocket floor 24 to the pocket edge 26, which protrudes above outer cover circumference $U_h$ by a distance c into the cover wall resp, cylindrical part 12 b of the cover 12, where the pocket 22 is also filled during the casting on of the cover 12.

The internal circumference $U_i$ of the brake ring 14 is separated from the cover circumference $U_h$ by a distance b creating an air gap 36 interrupted solely in the vicinity of the pockets 22.

FIG. 4 and 5 show further design variants of a pocket 22. At the pocket edge 26 an annular bead or web 30 protrudes outwards. In addition, an annular undercut 32 is located on the pocket inner surface 29 at the junction between the pocket wall 28 and the pocket edge 26. In FIG. 5 a ventilation opening 34 in the form of hole through the external friction ring 16 is also provided in the vicinity of the pocket floor 24. This ventilation opening 34 ensures that during the casting of the cover 12 on the brake ring 14, pocket 22 is completely filled.

Figure 7:
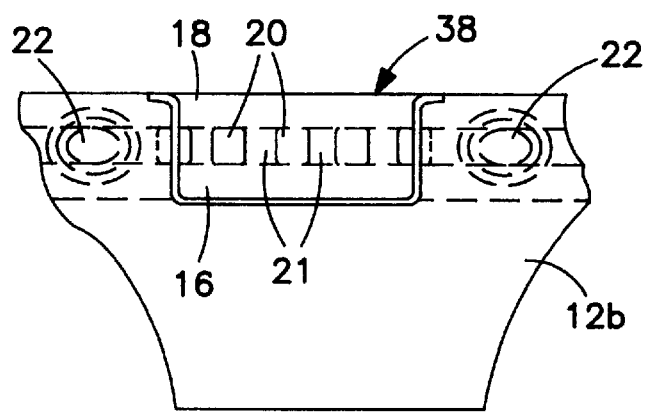
FIG. 7 a partial view of the brake disk of FIG. 6 viewed in the direction z.
Figure 8:
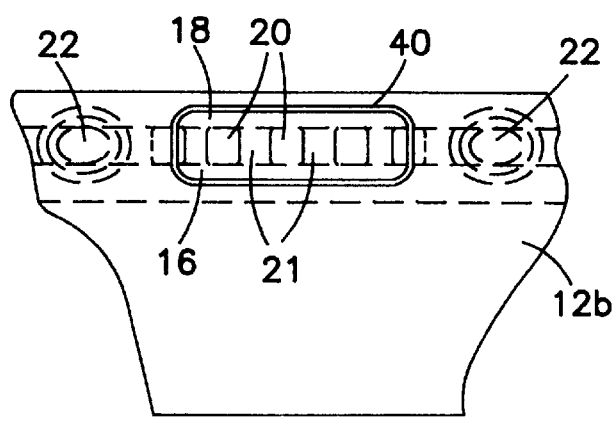
FIG. 8 a partial view of the brake disk of FIG. 6 with slot viewed in the direction z.

In the design variant of a brake disk 10 shown in FIG. 6 to 8 a recess 38 is provided in the cylindrical part 12b of the cover 12 between adjacent pockets 22. According to FIG. 7 this recess 38 may start from the outer edge of the cylindrical part 12b and extend over the entire width of the brake disk. The recess 38 of the variant shown in FIG. 8 is formed as a slot 40.

As indicated in FIG. 6 the recess 38 leads to a direct air passage from the cover to the radially positioned air gaps 21 of the brake ring 14 separated by the webs 20.

One example of a material for the manufacture of the cover 12 is the alloy G-AlSi12 CuNiMg. The brake ring can, for example, be constructed of cast grey iron. Although the design examples in the drawing relate to internally ventilated brake discs with external and internal friction rings, the above invention of course also covers the joining of pockets onto solid brake rings.

What is claimed is:

1. Brake disc with a cover (12) made of a cast aluminium alloy and a brake ring (14) made of cast steel or cast iron, where the cover (12) is cast onto anchoring pieces protruding radially inwards from the inner circumference ($U_i$) of the brake ring (14), leaving a radial spacing (b) between the cover (12) and the brake ring (14), characterised in that the anchoring pieces are constructed as pockets (22) formed on the brake ring each having radially inwardly facing pocket opening with a pocket edge (26) bordering the radially inwardly facing pocket opening, where the pocket edge (26) is surrounded by the cover casting (12) and the pockets (22) are substantially filled with the cast aluminium alloy.

2. Brake disc according to claim 1, characterised in that the number of pockets (22) is between approximately 3 and 14.

3. Brake disc according to claim 1, characterised in that an annular web (30) is formed on the pocket edge (26) and protrudes externally.

4. Brake disc according to claim 1, characterised in the pockets have a floor and the pockets (22) have an annular undercut (32) in the vicinity of the pocket edge (26).

5. Brake disc according to claim 1, characterised in the pockets have a pocket floor and a ventilation opening (34) is provided in the vicinity of the pocket floor (24).

6. Brake disc according to claim 1, characterised in that the cover has recesses between adjacent pockets (22) for a direct air passage to the brake ring (14).

7. Brake disk according to claim 6, characterised in that the recesses (38) are slots (40).

8. Brake disk according to claim 7, characterised in that the recesses (38) are formed during casting.

9. Brake disk according to claim 6, characterised in that the brake ring (14) has an external and an internal friction ring (16,18) with radially positioned connecting webs (20) and the pockets (22) are integrally formed with the connecting webs, whereby the recesses (38) lead to a direct air passage between the friction rings (16,18).

10. Brake disc according to claim 1, characterized in that the cover (12) is made of a heat-resistant aluminum alloy and the brake ring (14) is made of a material selected from the group consisting of cast steel and cast iron.

11. Brake disc according to claim 1, characterised in that the cover (12) is cast onto the brake ring (14).

12. Brake disc according to any of claims 1 to 11, characterised in that a connection between cover (12) and brake ring (14) is produced by sand casting, low pressure casting, chill casting, pressure casting, die casting, squeeze casting or thixo casting.

13. Brake disc according to claim 10, characterized in that the brake ring is made of a high carbon content iron alloy.

* * * * *